US007487845B2

(12) United States Patent
Carrier et al.

(10) Patent No.: US 7,487,845 B2
(45) Date of Patent: Feb. 10, 2009

(54) SAFETY MECHANISM FOR A ROTARY HAMMER

(75) Inventors: David A. Carrier, Aberdeen, MD (US); Daniel Puzio, Baltimore, MD (US); Robert Bradus, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/150,459

(22) Filed: Apr. 28, 2008

(65) Prior Publication Data

US 2008/0202786 A1 Aug. 28, 2008

Related U.S. Application Data

(62) Division of application No. 10/829,994, filed on Apr. 22, 2004, now Pat. No. 7,395,871.

(60) Provisional application No. 60/465,064, filed on Apr. 24, 2003.

(51) Int. Cl.
*B23B 45/02* (2006.01)

(52) U.S. Cl. .......................... 173/2; 73/494; 73/514.04; 173/176; 173/183; 408/6

(58) Field of Classification Search ..................... 173/1, 173/2, 176, 179, 183, 217; 192/147; 408/6, 408/9, 11; 73/494, 514.04, 514.39
See application file for complete search history.

(56) References Cited

U.S. PATENT DOCUMENTS 4,066,133 A 1/1978 Voss
4,152,833 A 5/1979 Phillips
4,249,117 A * 2/1981 Leukhardt et al. ........... 318/275
4,267,914 A 5/1981 Saar
4,316,512 A 2/1982 Kibblewhite
4,448,261 A 5/1984 Kousek et al.
4,502,549 A 3/1985 Hornung et al.
4,573,556 A 3/1986 Anderasson
4,638,870 A 1/1987 Kousek et al.
4,871,033 A 10/1989 Odoni et al.
5,201,373 A 4/1993 Bloechle
5,358,062 A 10/1994 Uhl et al.
5,385,052 A * 1/1995 Hofmann ................. 73/514.04
5,401,124 A 3/1995 Hettich
5,584,619 A 12/1996 Guzzella et al.
5,704,435 A 1/1998 Meyer et al.

(Continued)

FOREIGN PATENT DOCUMENTS

EP 0759343 A1 5/1997

(Continued)

*Primary Examiner*—Stephen F Gerrity
(74) *Attorney, Agent, or Firm*—Harness, Dickey & Pierce, P.L.C.

(57) ABSTRACT

An improved method is provided for controlling a power tool having a rotary shaft. The method includes: disposing an inertial mass in a housing of the power tool, such that the inertial mass is freely rotatable about an axis of rotation which is axially aligned with the rotary shaft; monitoring rotational motion of the power tool in relation to the inertial mass during operation of the power tool; and activating a protective operation based on the rotational motion of the power tool in relation to the inertial mass.

18 Claims, 22 Drawing Sheets

U.S. PATENT DOCUMENTS

| | | | | |
|---|---|---|---|---|
| 5,879,111 | A * | 3/1999 | Stock et al. | 408/6 |
| 5,914,882 | A | 6/1999 | Yeghiazarians | |
| 5,954,457 | A * | 9/1999 | Stock et al. | 408/6 |
| 5,984,020 | A | 11/1999 | Meyer et al. | |
| 5,996,707 | A | 12/1999 | Thome et al. | |
| 6,055,484 | A | 4/2000 | Lysaght | |
| 6,111,515 | A | 8/2000 | Schaer et al. | |
| 6,311,786 | B1 | 11/2001 | Giardino et al. | |
| 6,968,908 | B2 | 11/2005 | Tokunaga et al. | |
| 2001/0042630 | A1* | 11/2001 | Kristen et al. | 173/1 |
| 2006/0124331 | A1 | 6/2006 | Stirm et al. | |

FOREIGN PATENT DOCUMENTS

| | | | |
|---|---|---|---|
| JP | 55-5201 | A * | 1/1980 |

* cited by examiner

SAFETY MECHANISM FOR A ROTARY HAMMER

CROSS-REFERENCE TO RELATED APPLICATIONS

This application is a divisional of U.S. patent application Ser. No. 10/829,994 filed on Apr. 22, 2004, now U.S. Pat. No. 7,395,871, which claims the benefit of U.S. Provisional Application No. 60/465,064, filed on Apr. 24, 2003. The entire contents of the disclosures for each of these applications are incorporated herein by reference.

FIELD OF THE INVENTION

The present invention relates generally to a safety mechanism for a rotary hammer and, more particularly, to a method for detecting a bit jam condition in a power tool having a rotary shaft.

BACKGROUND OF THE INVENTION

The use of large rotary hammers is an effective way to bore holes into stone or concrete. Unfortunately, there are users who improperly use this type of power tool. For instance, when a user is holding the tool upright while drilling downward, there is a tendency to relax the grip on the rear handle. Since the rotational grab of the tool is minimized by the hammering action, it only takes a little force from the rear handle to stabilize the tool. The careless operator may not use the side handle, which is specifically designed to allow the user to manage the high torque created by stall conditions. Unfortunately, when the rotating bit encounters a piece of solid rock or rebar buried within the material, a jam condition could occur. When the bit jams, the rotational torque is instantly transferred to the tool housing. Since the user only has a slight grip on the rear handle, the tool housing will rotate. The clutch within the tool is typically set to a high level so as to handle relatively high torque situations. Even if the trigger is released as the tool twists out of the user's hand, the rotational motion of the tool is sufficient to injure the user.

Therefore, it is desirable to provide a method for controlling a power tool, such as a rotary hammer, at the onset of such a bit jam condition.

SUMMARY OF THE INVENTION

In accordance with the present invention, an improved method is provided for controlling a power tool having a rotary shaft. The method includes: disposing an inertial mass in a housing of the power tool, such that the inertial mass is freely rotatable about an axis of rotation which is axially aligned with the rotary shaft of the tool; monitoring rotational motion of the power tool in relation to the inertial mass during operation of the power tool; and activating a protective operation based on the rotational motion of the power tool in relation to the inertial mass. In one aspect of the invention, the angular velocity of the rotational motion is compared to a predefined velocity threshold indicative of a bit jam condition. In another aspect of the invention, the rotational displacement of the rotational motion is compared to a predefined displacement threshold indicative of a bit jam condition.

For a more complete understanding of the invention, its objects and advantages, reference may be made to the following specification and to the accompanying drawings.

DETAILED DESCRIPTION OF THE PREFERRED EMBODIMENTS

Figure 1:
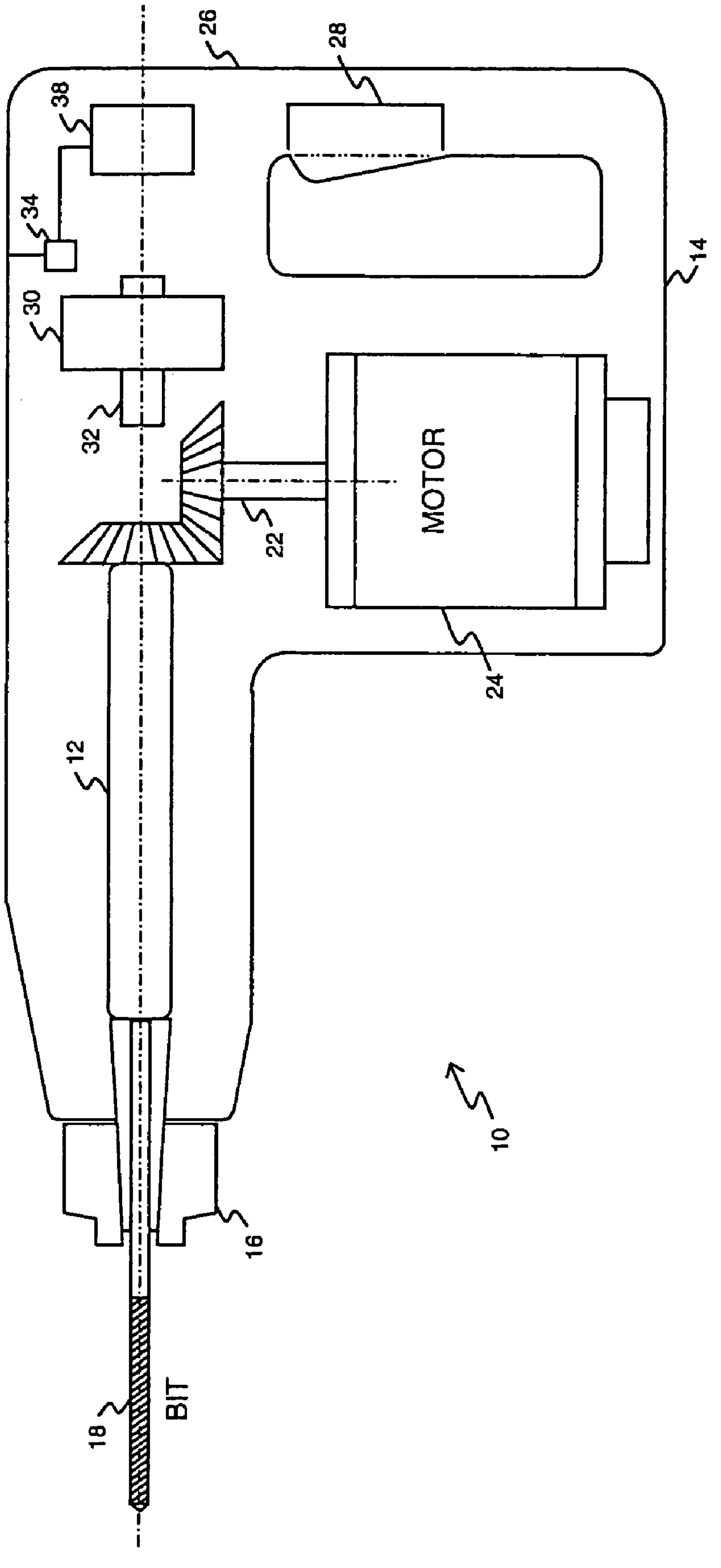
FIG. 1 is a longitudinal sectional view of an exemplary rotary hammer configured in accordance with the present invention.

FIG. 1 illustrates an exemplary power tool 10 having a rotary shaft 12. In particular, the exemplary power tool is a rotary hammer. While the following description is provided with reference to a rotary hammer, it is readily understood that the broader aspects of the present invention are applicable to other types of power tools having rotary shafts.

The rotary hammer 10 is comprised of a housing 14 having an outwardly projecting front end and a rear end. A spindle (or rotary shaft) 12 extends axially through the front end of the housing 14. A bit holder 16 for securely holding a hammer bit 18 or other drilling tool is coupled at one end of the spindle 12; whereas a drive shaft 22 of an electric motor 24 is connected at the other end of the spindle 12. The rear end of the housing is formed in the shape of a handle 26. To activate operation of the tool, an operator actuated switch 28 is embedded in the handle 26 of the tool. Although only a few primary components of the rotary hammer are discussed above, it is readily understood that other components well known in the art may be used to construct an operational rotary hammer.

The rotary hammer 10 is further adapted to detect a bit jam condition. An inertial mass is used as a reference frame for sensing rotational motion of the power tool. In one exemplary embodiment, a large wheel 30 serves as the inertial mass. The large wheel 30 is in turn coupled via a ball bearing or other type of low friction mounting to an axle 32, such that the large wheel 30 is freely rotatable about the axle. The axis of rotation for the large wheel 30 is preferably aligned concentrically with the axis of the spindle 12. However, it is also envisioned that the axis of rotation may be aligned slightly skewed from or in parallel with the axis of the spindle. Moreover, it is readily understood that other embodiments for the inertial mass are also within the scope of the present invention.

During operation of the tool, the inertial mass remains substantially stationary. If the bit encounters a jam condition, the bit no longer rotates relative to the worksurface. As a result, rotational torque is transferred to the housing, thereby causing it to rotate. This typically happens with relatively high acceleration. Since the inertial mass is freely coupled to the housing, it remains essentially stationary. However, in relation to the tool's housing, the inertial mass appears to rotate. As further described below, this sensed rotational motion may be used to control the operation of the tool.

Figure 2:
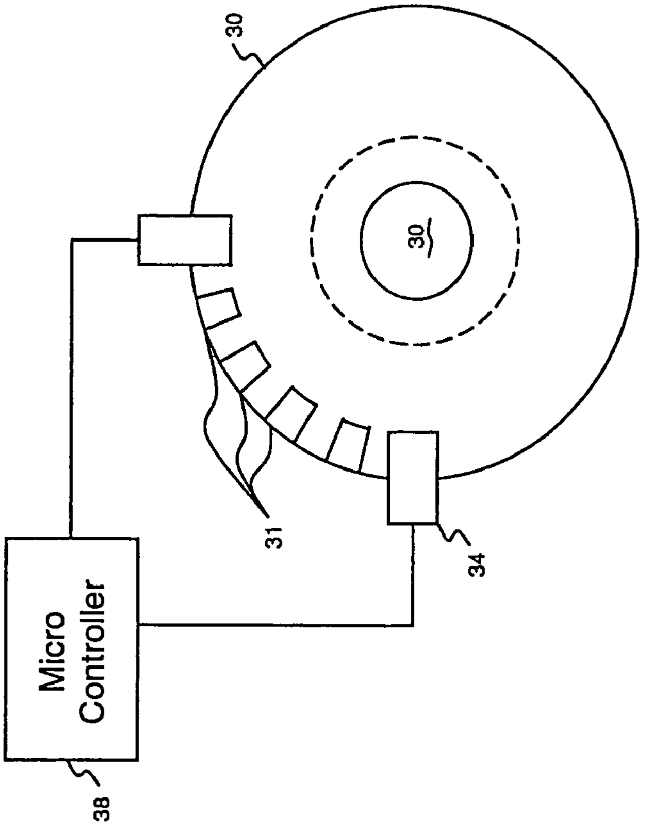
FIG. 2 is plan view of a rotational wheel and sensors configured within the rotary hammer.

To sense the rotational motion of the inertial mass, at least one sensor 34 is placed around the wheel 30. Specifically, a sensor is fixed to the housing of the tool, such that the sensor perceives the rotational motion of the inertial mass relative to the housing. In one exemplary embodiment, one or more optical sensors may be used to sense rotational motion and direction of the inertial mass. In this embodiment, the periphery of the wheel 30 may include a pattern of teeth or demarcations 31 which could be detected by the sensor as shown in FIG. 2. Although one sensor may be used to detect rotational motion, it is readily understood that two or more sensors may be used to determine rotational direction and/or improve measurement efficiency. Moreover, it is readily understood that other types of rotational sensors may also be used. For instance, Hall effect sensors, inductive sensors, optically reflective sensors, and/or optically transmissive sensors may be suitably used in the present invention.

Sensor output is conditioned and then fed into a microcontroller 38 embedded within the housing of the power tool. Exemplary signal conditioning may include a low pass filter and hysteresis in order to block high frequency edge jitter and noise contained in the sensor output signals. Based on the conditioned sensor output, the microcontroller 38 is operable to determine a bit jam condition.

Figure 3:
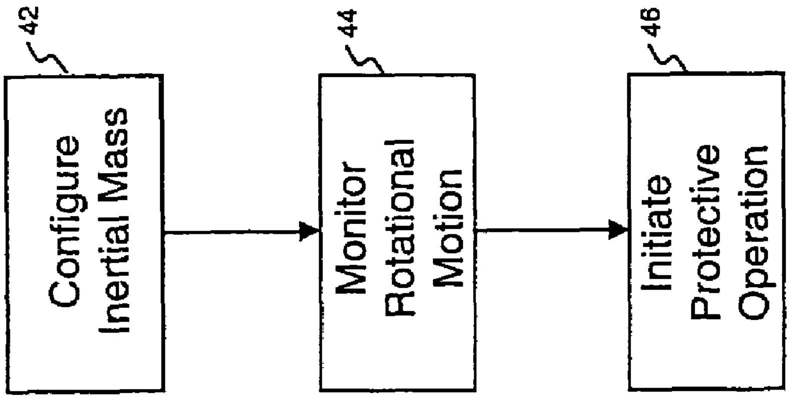
FIG. 3 is a flowchart illustrating an improved method for controlling the operation of a power in accordance with the present invention.

In accordance with the present invention, an improved method for controlling the operation of a power tool is shown in FIG. 3. First, the power tool is configured to detect the bit jam condition as described above. Specifically, an inertial mass is disposed in a housing of the power tool at step 42, such that the inertial mass is freely rotatable about its axis of rotation and preferably aligned axially with the rotary shaft of the power tool.

During operation of the power tool, rotational motion of the power tool in relation to the inertial mass is monitored at step 44. Sensed rotational motion may be used to determine a bit jam condition as further described below. Upon determining a bit jam condition, the microcontroller initiates a protective operation as shown at step 46. Exemplary protective operations may include (but are not limited to) braking the rotary shaft, braking the motor, disengaging the motor from the rotary shaft, cutting power to the motor and/or reducing slip torque of a clutch disposed between the motor and the rotary shaft. Depending on the size and orientation of the tool, one or more of these protective operations may be initiated to prevent further undesirable rotation of the tool.

An exemplary overload clutch for reducing slip torque between the motor and the rotary shaft is briefly described below. Generally, an overload clutch will comprise a driven member and a driving member and a coupling element, for example a resilient element or clutch balls biased by a resilient element, for coupling the driven member and driving member below the predetermined torque and for enabling de-coupling of the driven member and the driving member above the predetermined torque. Therefore, the overload clutch may have a first mode of operation in which the overload clutch transmits rotary drive to the spindle below a first predetermined torque and stops transmission of rotary drive above the first predetermined torque, a second mode of operation in which the overload clutch transmits rotary drive to the spindle below a second predetermined torque, different from the first predetermined torque and stops transmission of rotary drive above the second predetermined torque. The arrangement for detecting bit jam conditions may act to move the coupling element, such as a resilient element, with respect to the driven and driving members in order to vary the torque at which the overload clutch slips. Alternatively, the driven member can be coupled to the output of the overload clutch by a drive coupling and the arrangement for detecting bit jam condition acts on the drive coupling to cut off the transmission of rotary drive in response to the detection of a bit jam condition. FIGS. 13-25 illustrate a few exemplary overload clutches that may be suitable for use in a rotary hammer.

Figure 4:
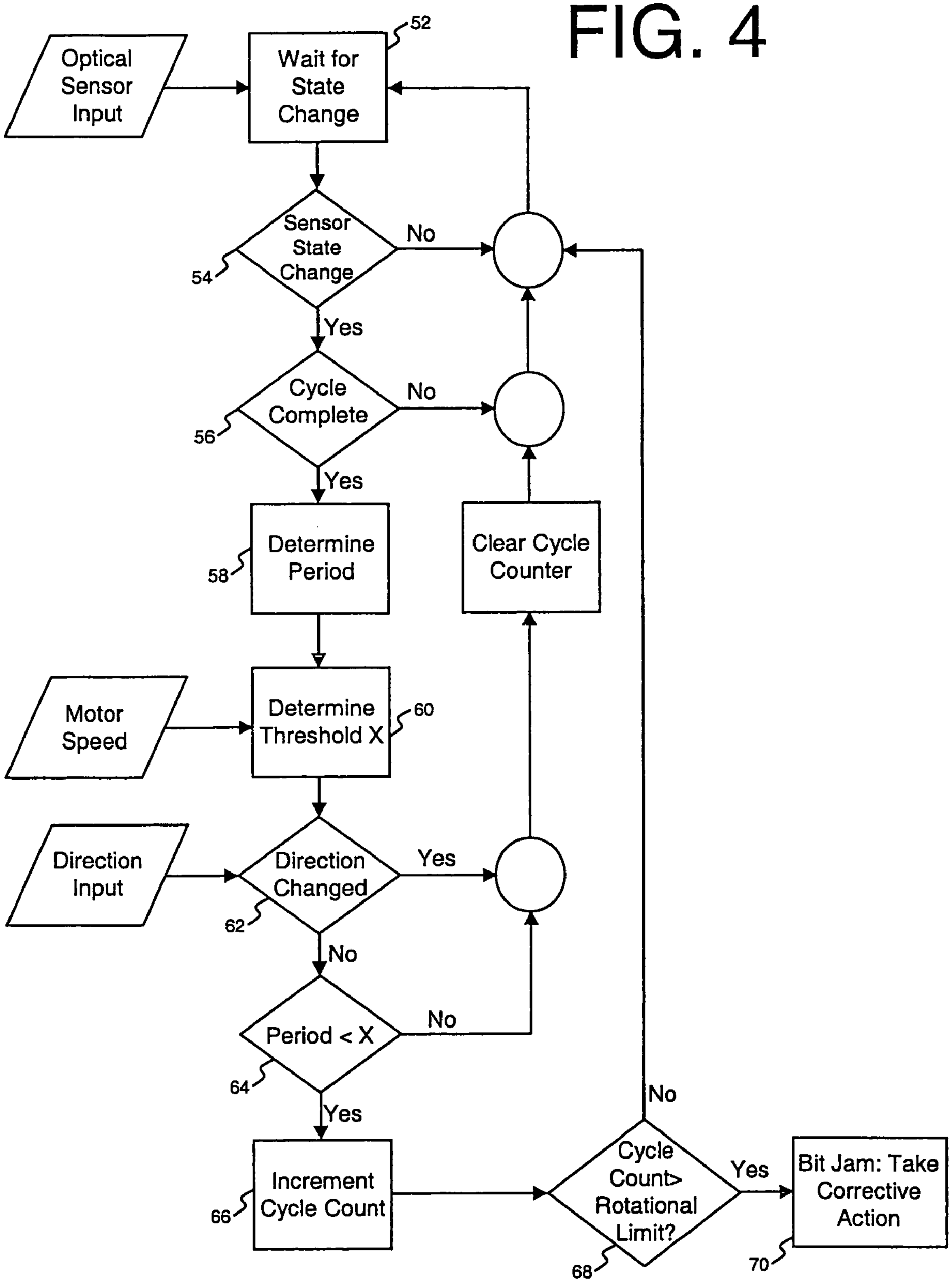
FIG. 4 is a flowchart depicting a first exemplary embodiment for determining a bit jam condition in accordance with the present invention.
Figure 5:
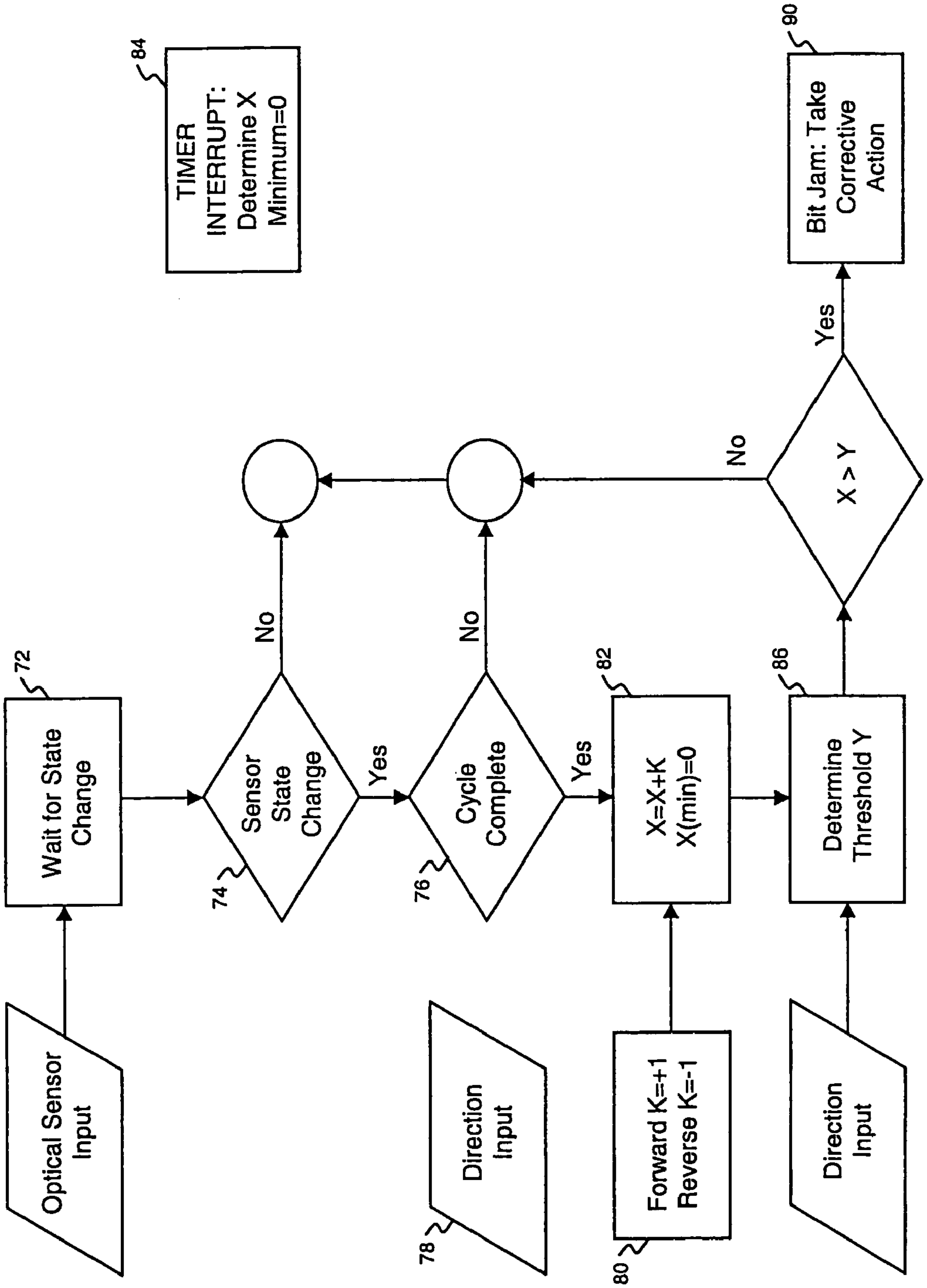
FIG. 5 is a flowchart depicting a second exemplary embodiment for determining a bit jam condition in accordance with the present invention.

Two preferred techniques for determining a bit jam condition are further described in relation to FIGS. 4 and 5. In both approaches, sensor output is monitored for state changes indicative of rotational motion of the housing in relation to the inertial mass. For illustration purposes, the term cycle is used to describe rotational motion that changes the state of the sensor output from high to low and back to high. To increase resolution, it is envisioned that a cycle may also correspond to a single state change of sensor output (i.e., from high to low or from low to high). It is envisioned that the demarcations detected by the optical sensors are spaced at consistent intervals, such that each cycle correlates to a known displacement amount. In addition, the spacing of the demarcations should be configured such that vibration occurring during normal operation of the power tool does not cause a state change of the sensor output.

Referring to FIG. 4, a first technique for determining a bit jam condition is based on angular velocity of the rotational motion of the housing. In operation, the software-implemented algorithm receives sensor output and waits for a state change in the sensor output as shown at step 52. At periodical time intervals, a determination is made at step 54 as to whether a change has occurred in sensor output. When a state change occurs, a determination is the made at step 56 as to whether a complete cycle has occurred. When a cycle is completed, the period associated with the cycle is determined at step 58, where the period is defined as the time in which it takes the cycle to complete; otherwise, processing continues to wait for the next detected state change at step 52. It is readily understood that since each cycle correlates to a known displacement value, the measured period directly translates to a measure of angular velocity.

Next, a threshold period indicative of a bit jam condition is determined at step 60. In a preferred embodiment, the threshold period is based on the current motor speed of the power tool. Lower motor speeds will produce lower rotational velocities of the housing. Thus, if the current motor speed is low, then the threshold period should be a higher value than if the motor was at normal operating speeds. Conversely, if the current motor speed is relatively high, then the threshold period should be a lower value than if the motor was at normal operating speeds. It is envisioned that the applicable threshold value may be derived by one or more predefined formulas, from a look-up table or other known techniques. One skilled in the art will also recognize that at very low tool speeds, such as at start-up, the inertial mass may have to overcome enough friction that its use as a stationary reference frame is not valid.

In this case, the inertial mass may rotate slightly with the tool producing an attenuated sensor rotation value, thereby necessitating a higher threshold period.

The cycle period is then compared to the threshold period at step 64. When the cycle period is less than the threshold period, the controller initiates a protection operation at step 70. When the cycle period is equal to or greater than the threshold period, processing returns to step 52 and awaits the next detected state change.

Prior to assessing angular velocity, the preferred algorithm may check the direction of rotational motion as shown at step 62. In some instances, the tool operator may retain control of the tool at the onset of and/or during a bit jam condition. If the power tool is pulled back in the direction of its previous orientation, the inertial mass will spin in the opposite direction. Thus, if the direction of rotational motion is reversed, it is assumed that the user has retained control of the tool, such that no corrective action is needed and processing returns to step 52. On the other hand, if the direction of the rotational motion remains consistent with the normal direction of operation, then processing continues to step 64.

In conjunction with angular velocity, rotational displacement of the housing may also be used to determine when corrective action is needed. At step 66, a cycle counter is incremented. Since each cycle correlates to a known amount of rotational displacement, the cycle counter maintains a measure of the total rotational displacement of the housing.

Total rotation displacement of the housing is then assessed at step 68. If the total rotational displacement exceeds some predefined displacement limit (e.g., around 45 degrees), then it is assumed that the operator is unlikely to retain control of the tool and corrective action is needed. Thus, the controller initiates a protection operation at step 70. If the total rotational displacement is less than or equal to the predefined displacement limit, then the system allows the operator an opportunity to regain control of the tool. In this scenario, processing returns to step 52.

An alternative technique for determining a bit jam condition is illustrated in FIG. 5. This technique assesses the rotational displacement of the housing within a given period. To do so, the software-implemented algorithm receives sensor output and waits for a state change in the sensor output as shown at step 72. At periodical time intervals, a determination is made at step 74 as to whether a change has occurred in sensor output. When a state change occurs, a determination is the made at step 76 as to whether a complete cycle has occurred.

The direction of any rotational motion is also concurrently being monitored and thus serves as an input as shown at step 78. When the rotational direction is forward (i.e., an expected direction of operation), an incremental factor K is made positive at step 80, where K is proportional to the degrees of rotation that correlate to one cycle. When the rotational direction is reverse, then the K factor is made negative at step 80. The applicable K factor is then added to counter X at step 82. Thus, the counter maintains the cumulative amount of rotational motion within a given period. It is envisioned that the counter is not decremented to less than zero.

At periodic time intervals, the counter is decremented by a predefined decrement value. It is readily understood that this function may be achieved using an interrupt routine as shown at block 84. While this may seem to hinder the algorithm's ability to detect a threshold breech, the timing function is relatively slow when compared with the bit jam event. The decrement function is designed to always return the counter to zero even when the inertial mass does not move. As an example, assume a small jam occurs and the tool rotates 30degrees before the user regains control. The tool operator subsequently slowly pulls the tool back to its normal position over a one second time period. Since this position change is slow and gradual, the inertial mass doesn't record the fact the tool as return to its previous position. However, the interrupt timer subroutine slowly resets the counter to zero. Thus, the decrement amount and the interrupt frequency are chosen to have a time-constant similar to a user's controlled rate-of-return (without IM response.)

Figure 6:
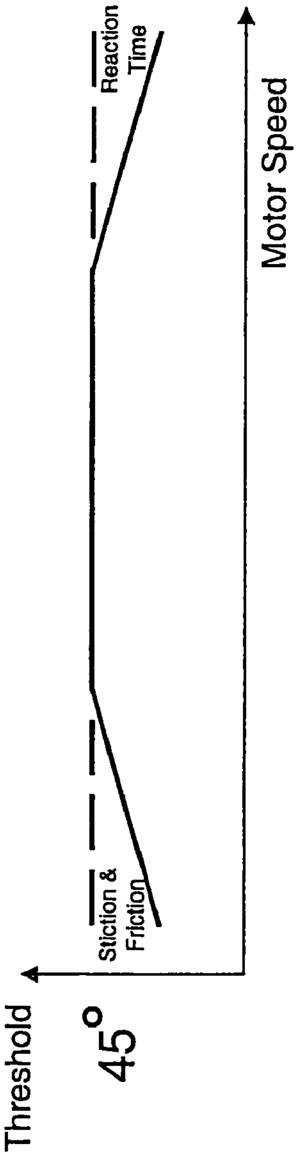
FIG. 6 is a diagram illustrating an exemplary relationship between the displacement threshold and the current motor speed of the tool in accordance with the present invention.

Next, a displacement threshold indicative of a bit jam condition is determined at step 86. In general, the system is designed to prevent rotation beyond 90 degrees. To achieve this objective, the displacement threshold is typically set to approximately 45 degrees as shown in FIG. 6. At typical operating speeds, this threshold setting allows an additional 45 degrees in which to stop rotation of the tool. However, at very low tool speeds (such as start-up), the inertial mass may have to overcome enough friction that that its use as a stationary reference frame is not valid. With these frictions, the inertial mass will rotate slightly with the tool producing an attenuated sensor rotation value. To compensate for component life, contamination (if sensed) and other frictional factors which can be sensed, the displacement threshold is decreased with decreasing motor speed. At relatively high speed, more time is needed to prevent rotation beyond 90 degrees. Thus, on the opposite end of the graph, the displacement threshold is likewise decreased with increasing motor speed, thereby allowing more time to stop the rotation of the tool. In other words, the displacement threshold is preferably based on the current motor speed.

The sensed rotational displacement is then compared with the displacement threshold at step 88. When the sensed rotational displacement is greater than the displacement threshold, the controller initiates a protection operation at step 90. When the sensed rotational displacement is less than or equal to the displacement threshold, processing returns to step 72 and awaits the next detected state change.

Two exemplary techniques for determining a bit jam condition have been set forth above. However, it is readily understood that other techniques for determining a bit jam condition are also within the broader aspects of the present invention. For instance, other metrics relating to the rotational motion of the housing, such as velocity and/or acceleration, may be measured directly or derived from the sensor output and used to determine a bit jam condition.

In another aspect of the present invention, a housing sub-assembly is provided for enclosing the inertial mass within the housing of the power tool. Dust and dirt may interfere with the bearings of the inertial mass as well as interfere with the ability of sensors to detect any rotational motion of the inertial mass. The housing sub-assembly encloses the inertial mass within the housing of the power tool, thereby preventing undesirable dirt and dust from interfering with the operation of the bit jam detection mechanism.

Figure 7A:
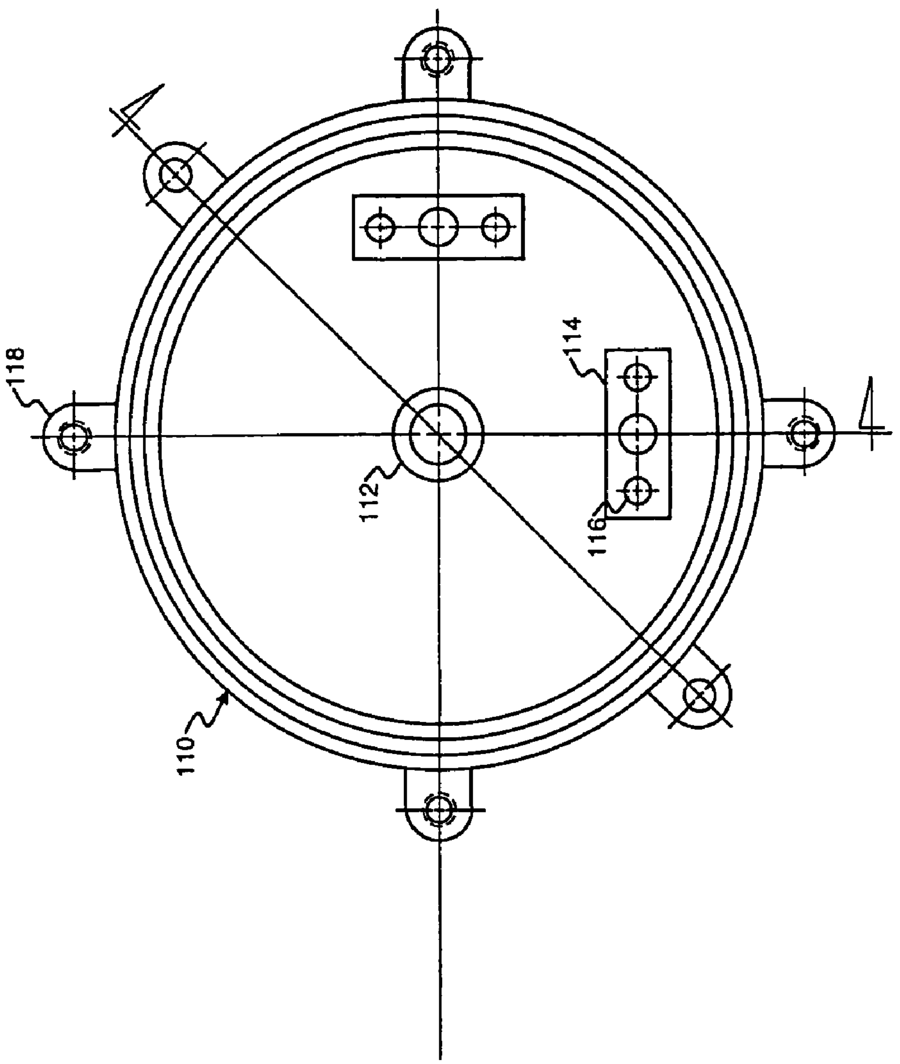
FIG. 7A is a top view of a receptacle that forms part of a sub-assembly housing for the inertial mass in accordance with the present invention.
Figure 7B:
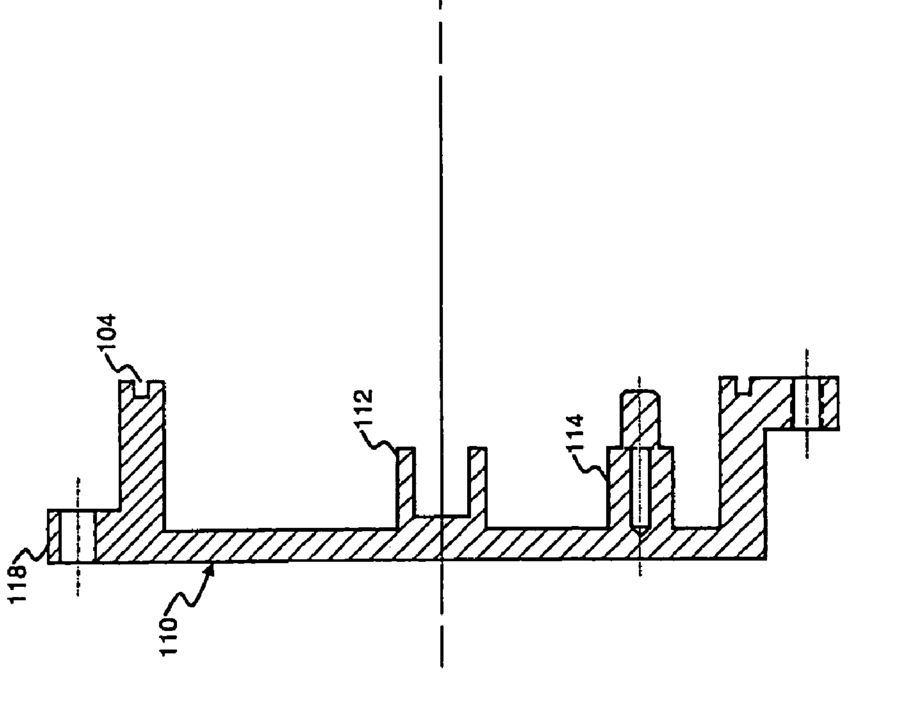
FIG. 7B is a cross-sectional side view of the receptacle in accordance with the present invention.
Figure 8A:
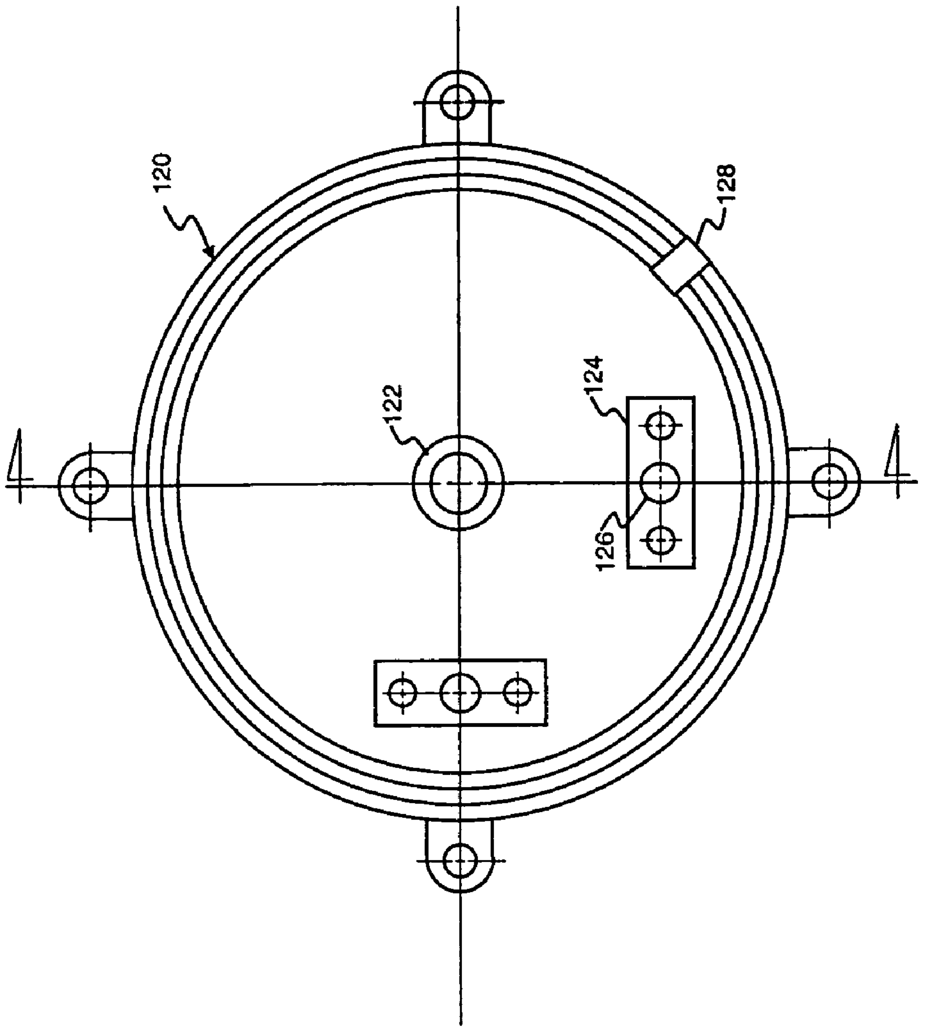
FIG. 8A is a top view of a cover that forms part of a sub-assembly housing for the inertial mass in accordance with the present invention.
Figure 8B:
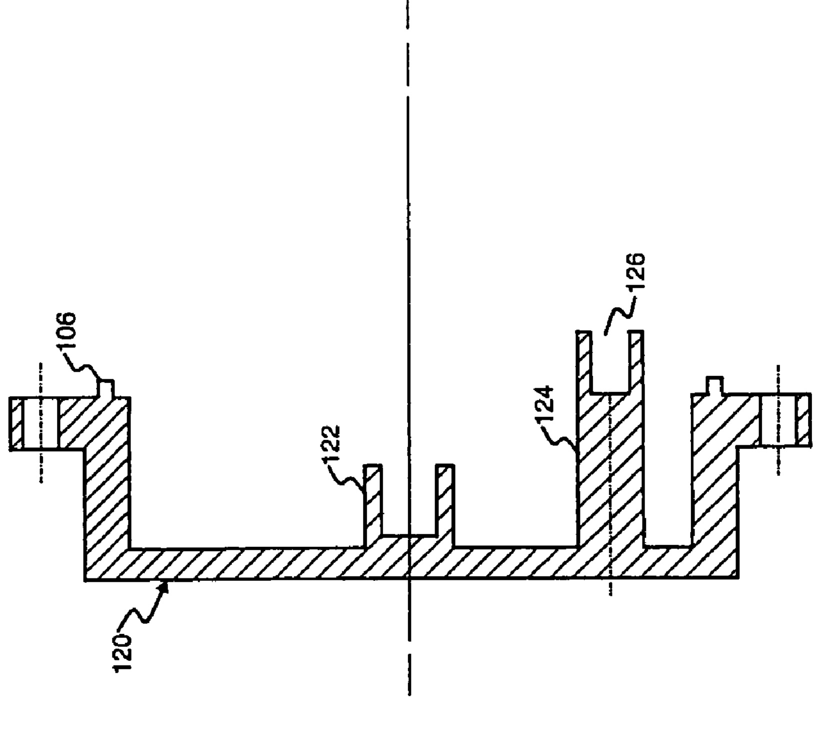
FIG. 8B is a cross-sectional side view of the receptacle in accordance with the present invention.
Figure 9:
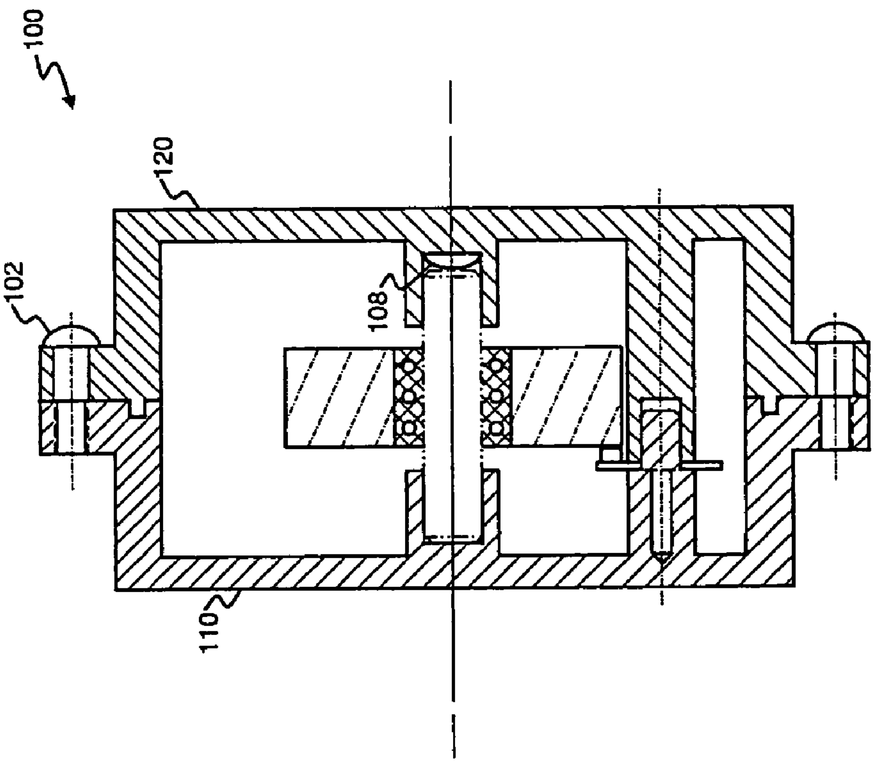
FIG. 9 is a cross-sectional side view of the sub-assembly housing for the inertial mass in accordance with the present invention.

FIGS. 7-9 illustrate an exemplary embodiment of a housing sub-assembly 100. The housing sub-assembly 100 is primarily comprised of two pieces: a cylindrical receptacle 110 and a cover 120. Referring to FIGS. 7A and 7B, a hollow cylindrical member 112 is formed in the center of the receptacle 110. A hole formed is the cylindrical member 112 is sized to receive the axle or shaft on which the inertial mass rotates. The receptacle also includes a means for mounting one or more sensors in relation to the inertial mass. In one exemplary embodiment, the mounting means is defined as a sensor mounting pillar 114 which extends from the bottom surface of the receptacle. To align the sensors thereon, one or more guide posts 116 extend upwardly from a mounting surface of the pillar 114. The guide posts are intended to pass through mating holes residing on a mounting (circuit) board of the sensor. It is readily understood that other sensor mounting means are within the broader aspects of the present invention. Various lugs 118 also extend outwardly from a side outer surface of the receptacle. As further described below, the lugs 118 may be used to fasten the cover 120 to the receptacle 110 as well as to fasten the housing sub-assembly 100 within the housing of the power tool.

FIGS. 8A and 8B illustrate the accompanying cover 120. Likewise, the cover 120 includes a hollow cylindrical member 122 which extends upwardly from its bottom surface. A hole defined in the cylindrical member 122 is sized to receive the opposite end of the axle on which the inertial mass rotates. The sensor mounting means described above is further defined by a pillar 124 which also extends upwardly from the bottom surface of the cover 120. The pillar 124 axially aligns with the sensor mounting pillar 114. In an assembled configuration, a hole 126 formed in the pillar 124 encapsulates an end of the guide post 116 which extends through the sensor mounting board, thereby securely mounting the sensor within the sub-assembly housing. To ensure a tight fit, it is understood that washers and/or gaskets may be interposed between the two pillars. One or more grooves 128 formed in the cover allow for egress of wires electrically coupled to the internally mounted sensors. It is envisioned that such grooves may be formed in the receptacle, the cover or some combination thereof. It is further envisioned that lead wires passing through the grooves may be fitted with a grommet or o-ring to seal the egress.

FIG. 9 illustrates an assembled configuration of the sub-assembly housing 100. In the illustrated embodiment, the cover 120 is coupled to the receptacle 110 using fasteners 102, where the fasteners pass through the lugs which extend outwardly from the cover and the receptacle. The cover 120 and receptacle preferably form a seal to prevent dust ingress. To provide a seal, the sub-assembly housing may employ tongue and groove mating. For example, a groove 104 formed in the receptacle receives a protruding tongue member 106 which extends from the cover. The protruding tongue member may alternatively be in the form of a groove. In either case, a gasket or o-ring may be used to further seal the sub-assembly housing. In an alternative embodiment, tongue and groove configuration is sealed using ultrasonic welding. It is readily understood that other techniques for sealing the enclosure are with the scope of the present invention.

Figure 10A:
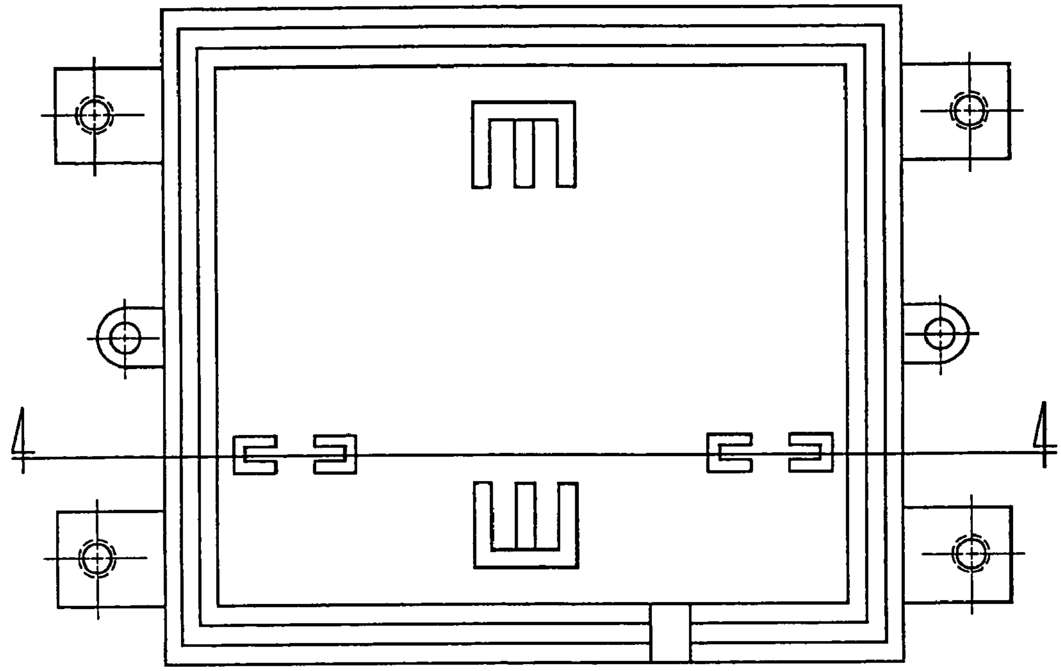
FIGS. 10-12 illustrate an alternative sub-assembly housing for the inertial mass in accordance with the present invention.
Figure 10B:
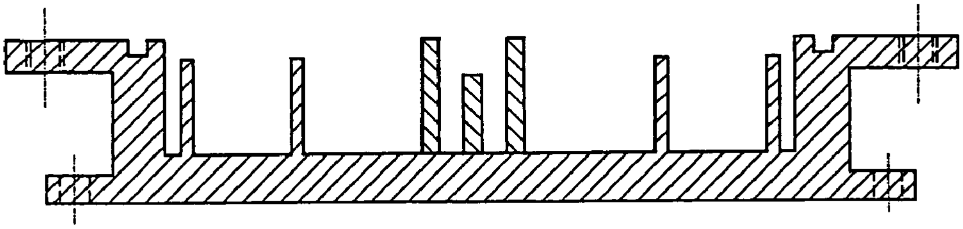
Figure 11A:
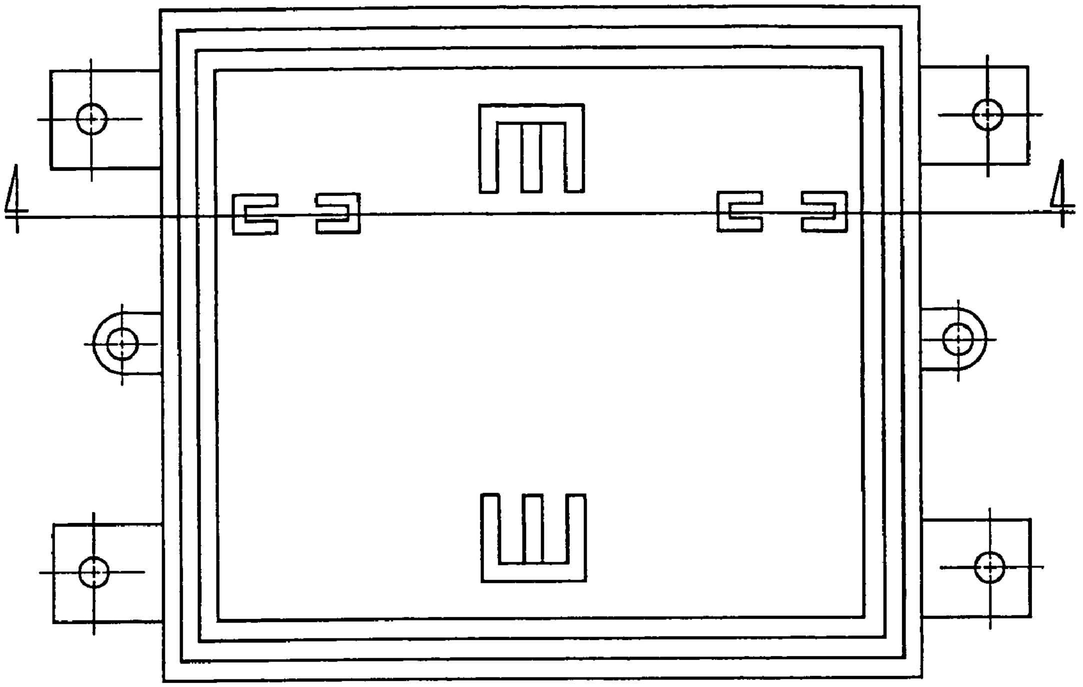
Figure 11B:
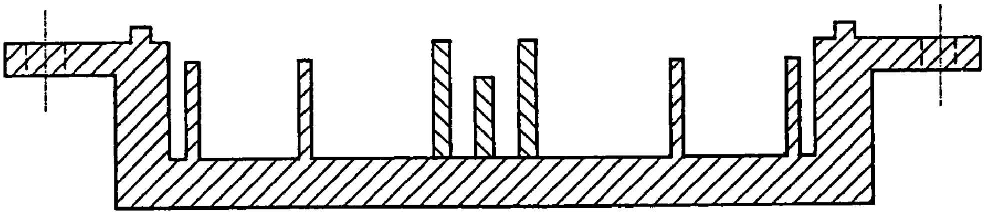
Figure 12:
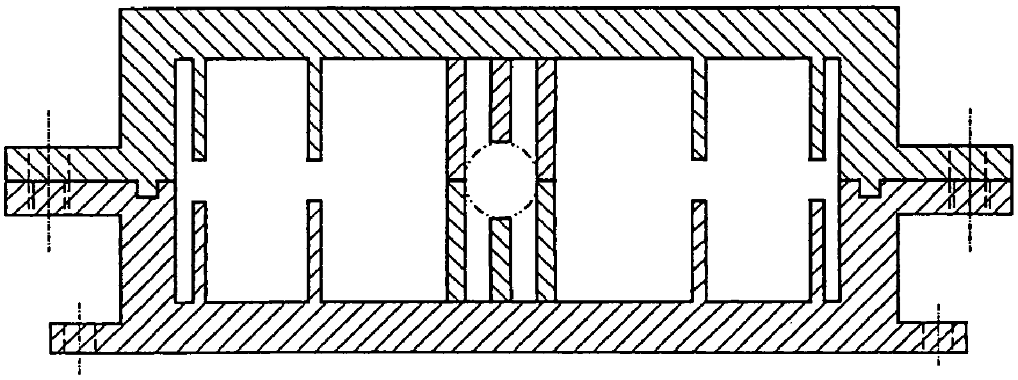
Figure 13:
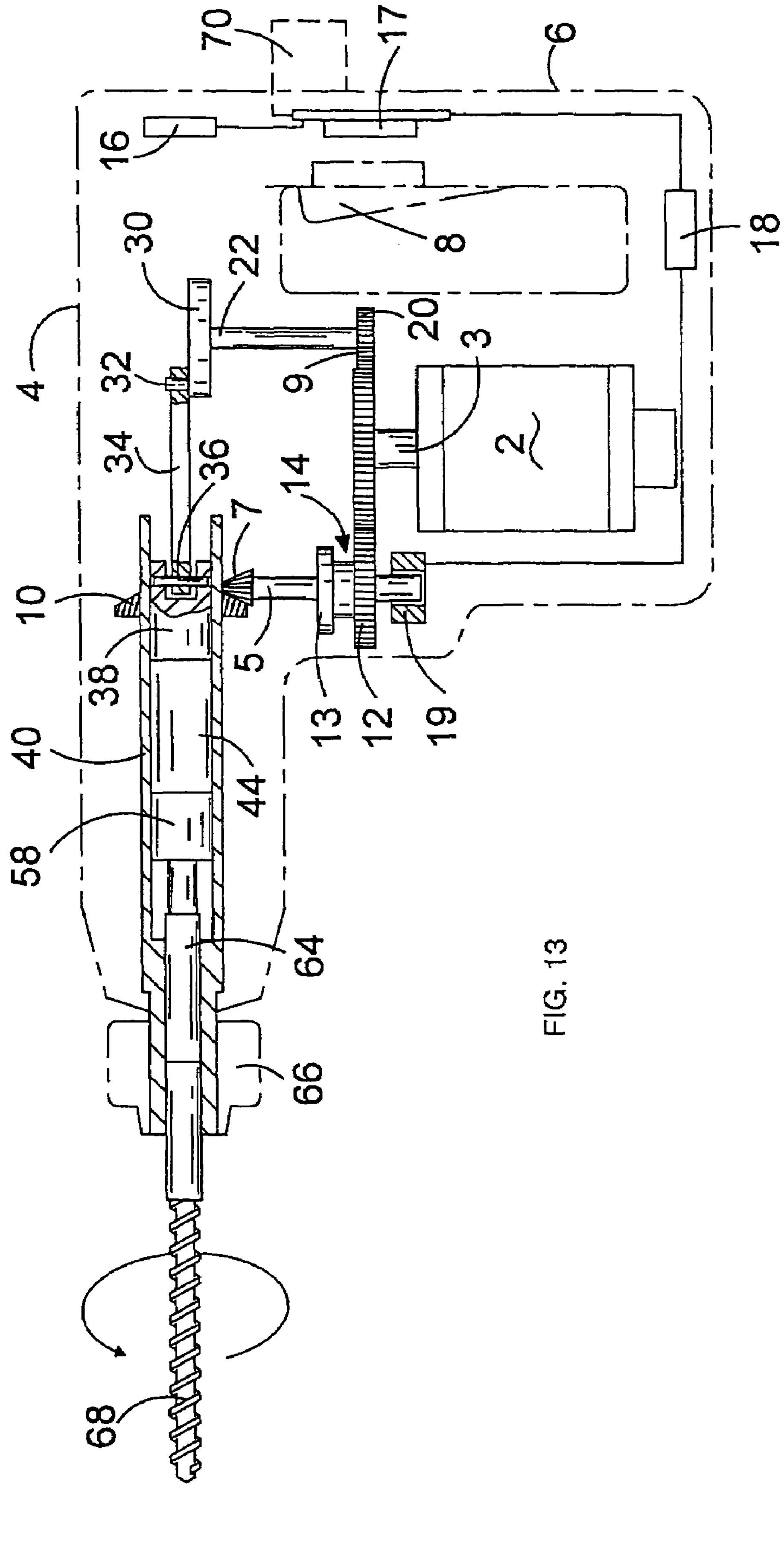
FIGS. 13-25 illustrate exemplary overload clutches that may be suitable for use in a rotary hammer.
Figure 14:
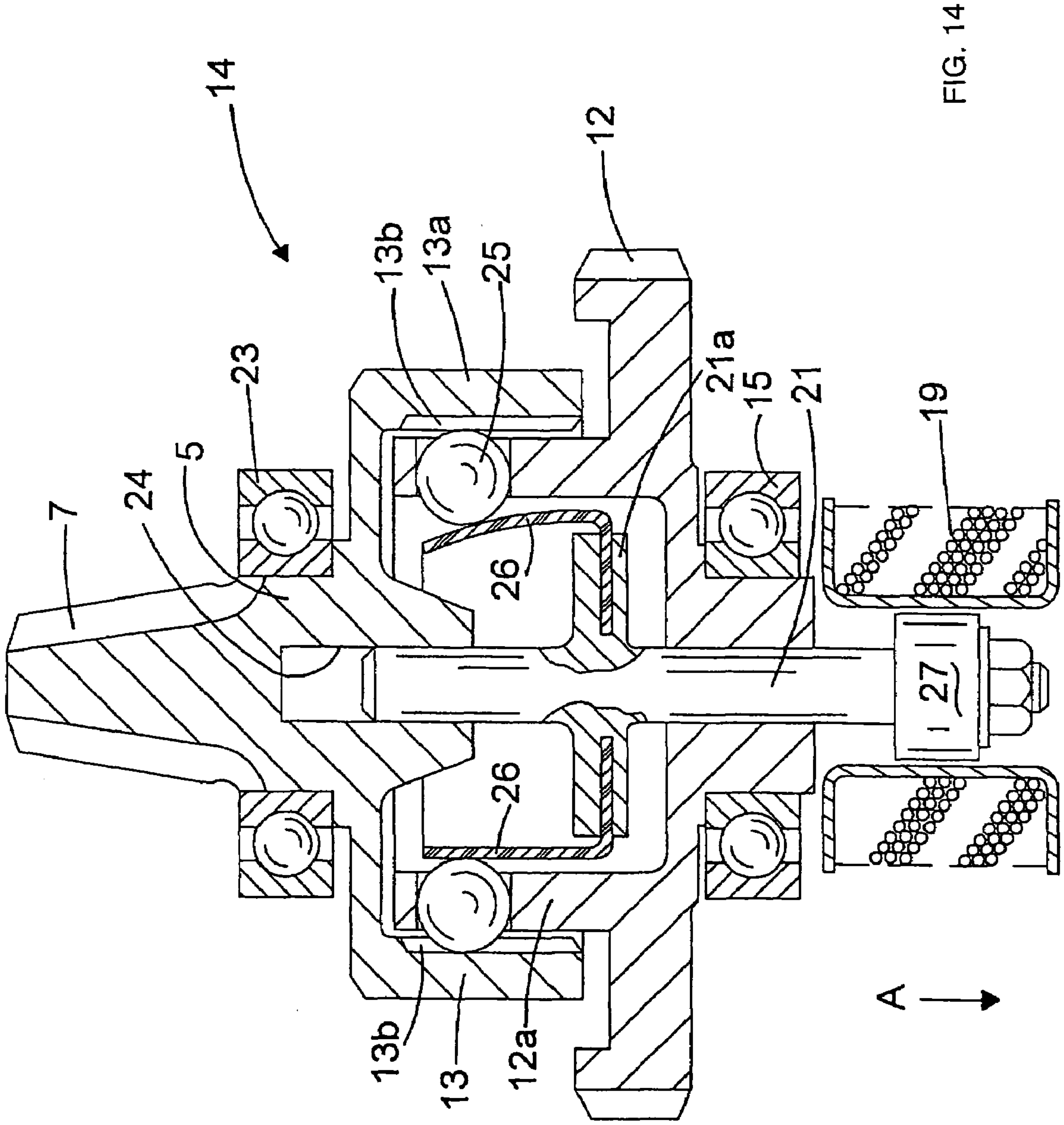
Figure 15:
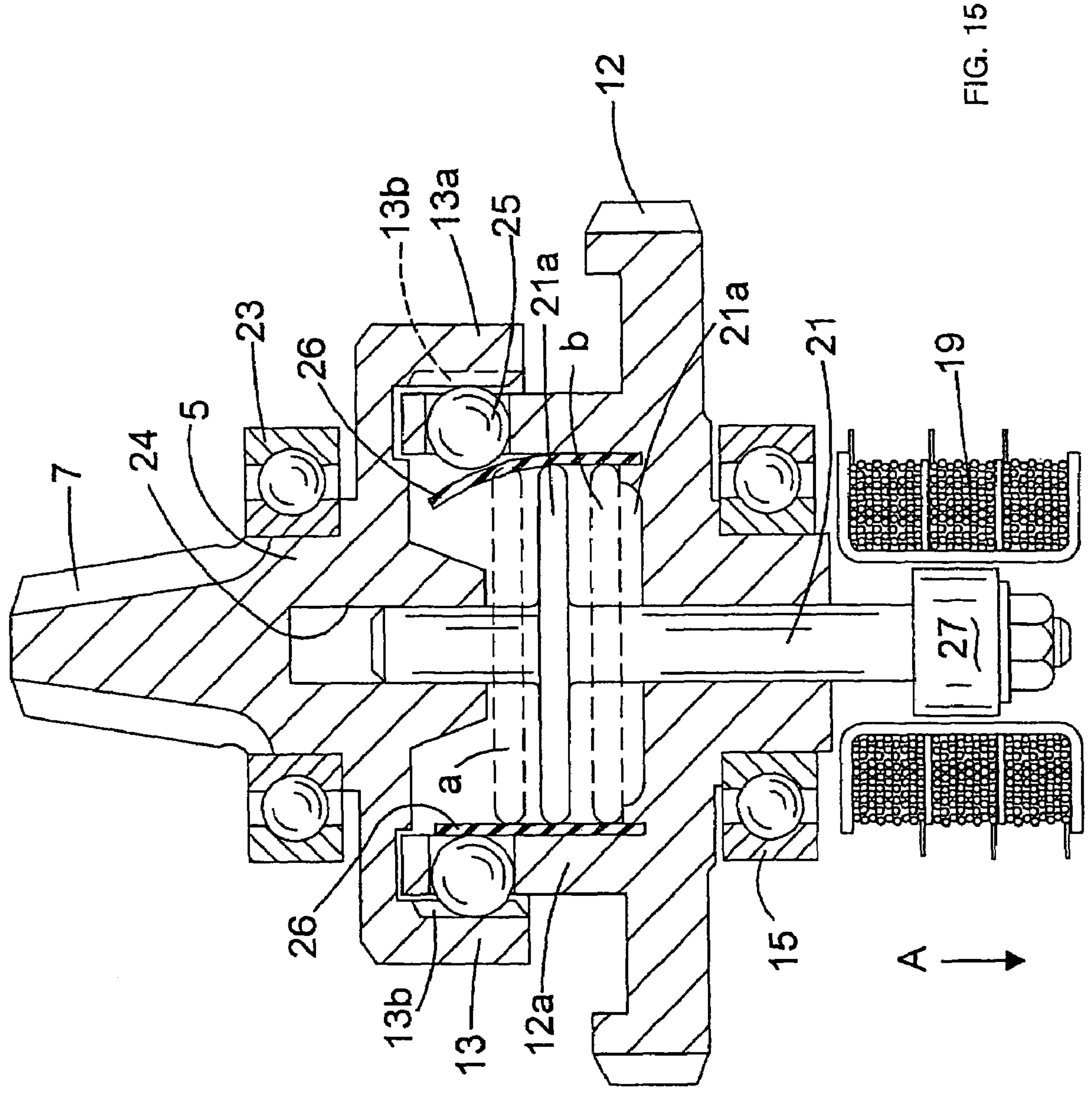
Figure 16:
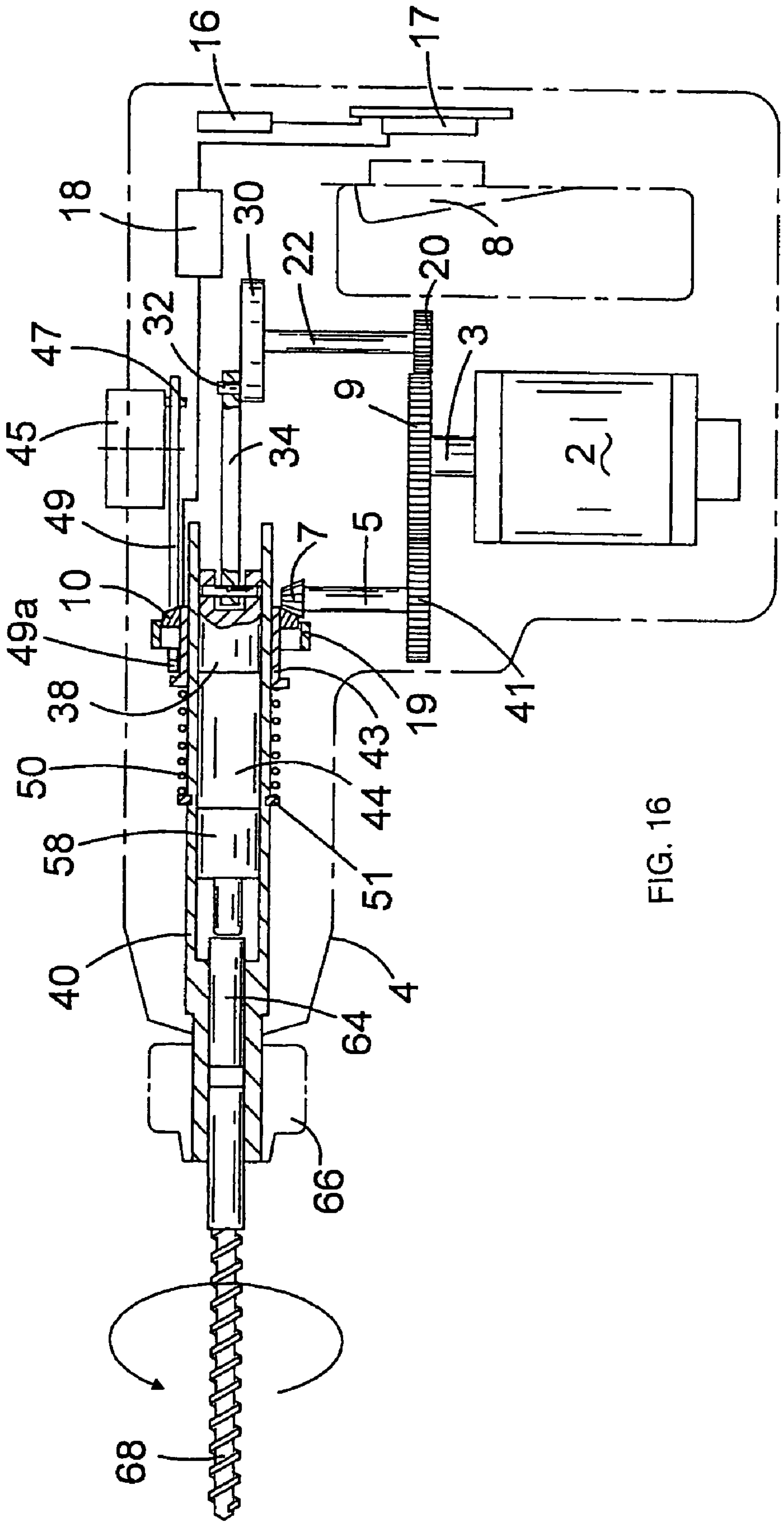
Figures 17, 18:
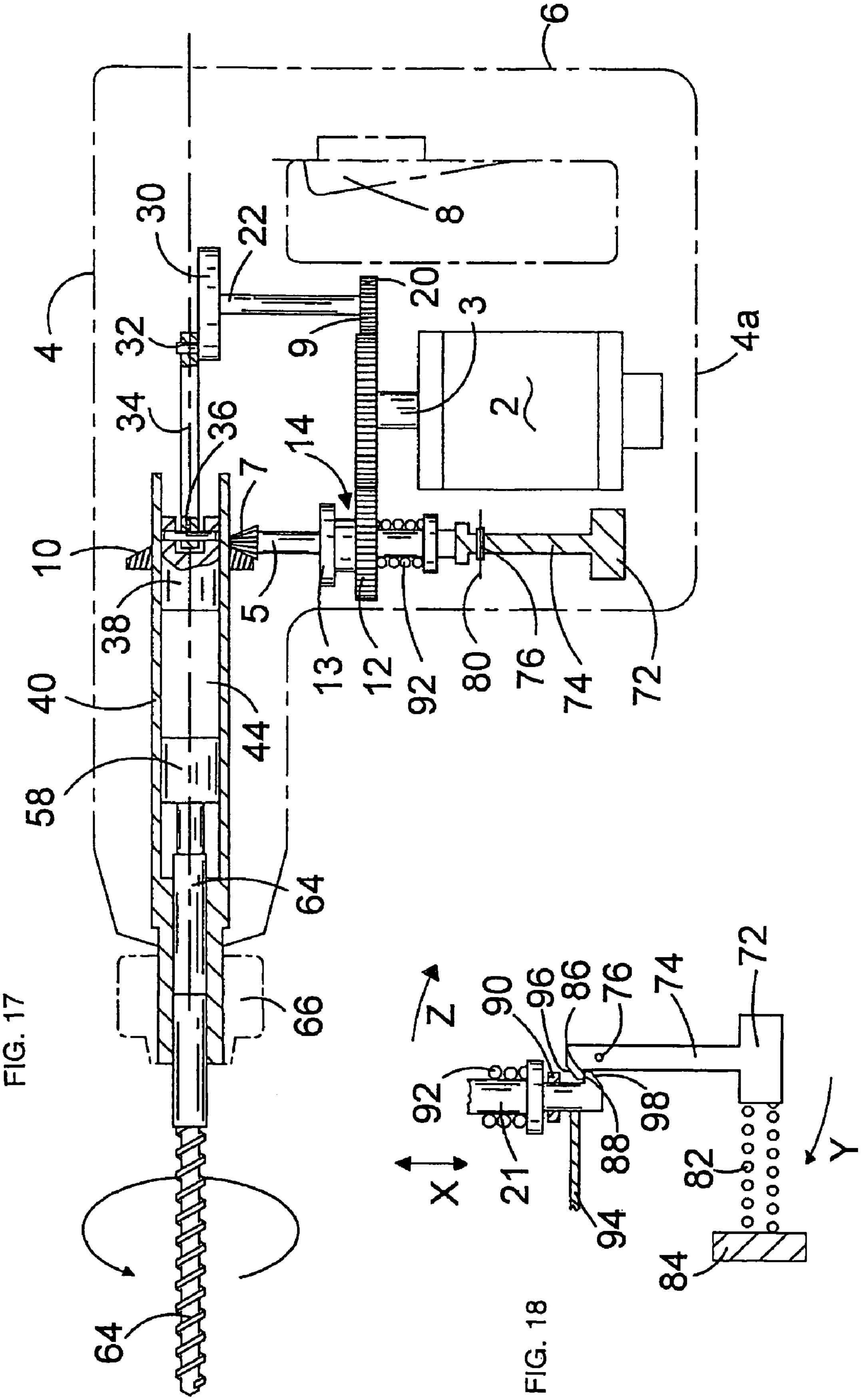
Figure 19:
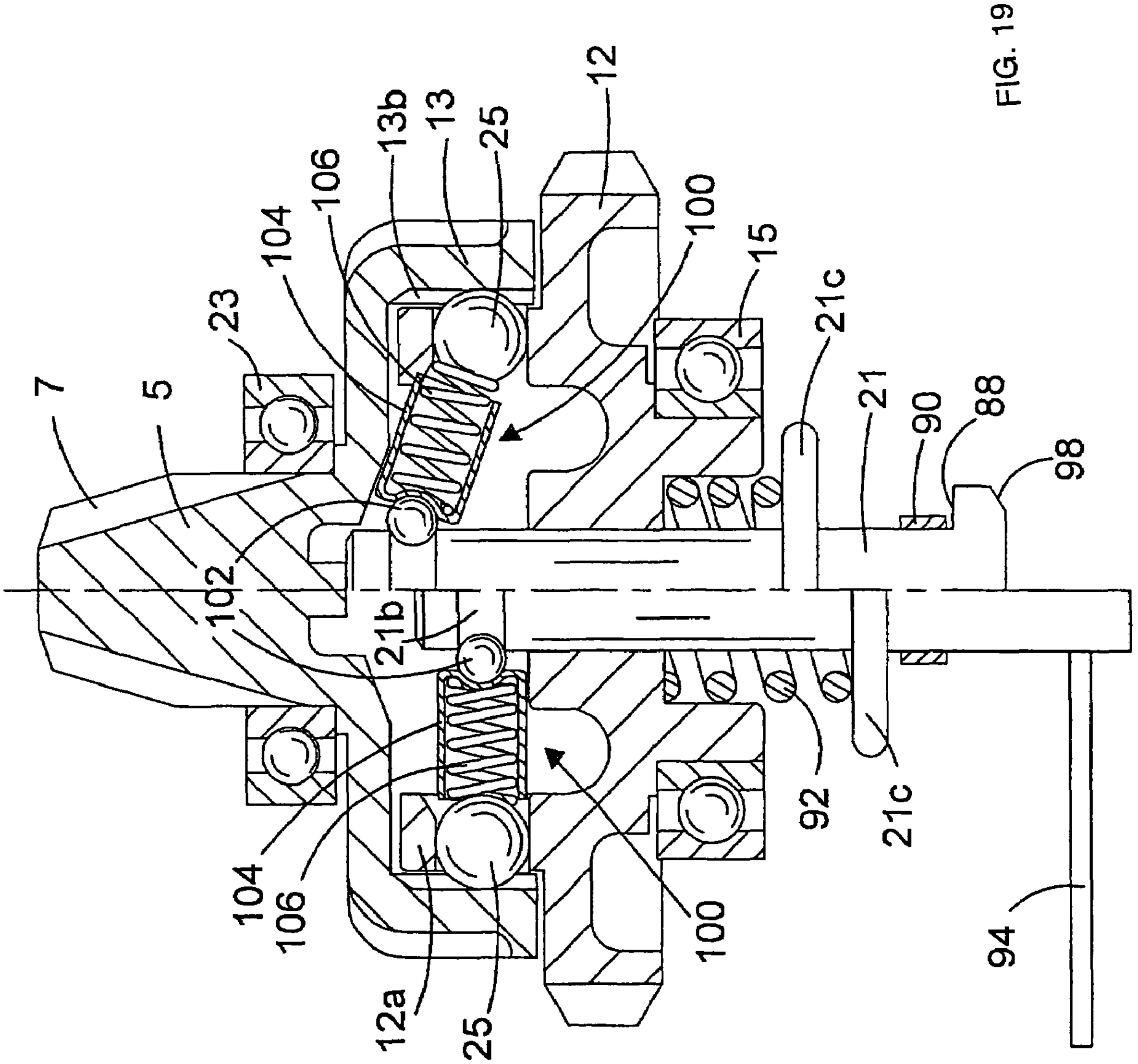
Figure 20:
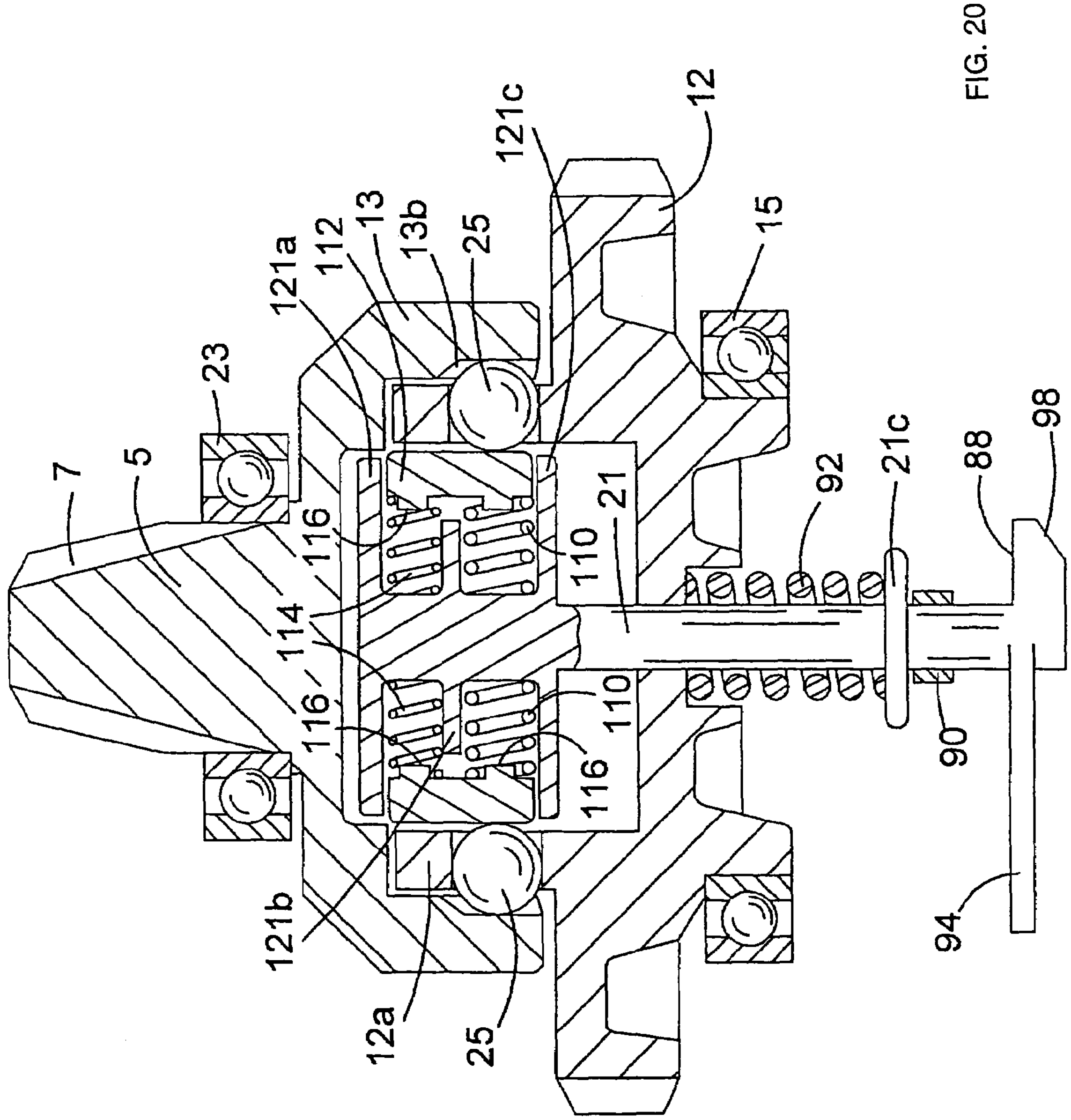
Figure 21:
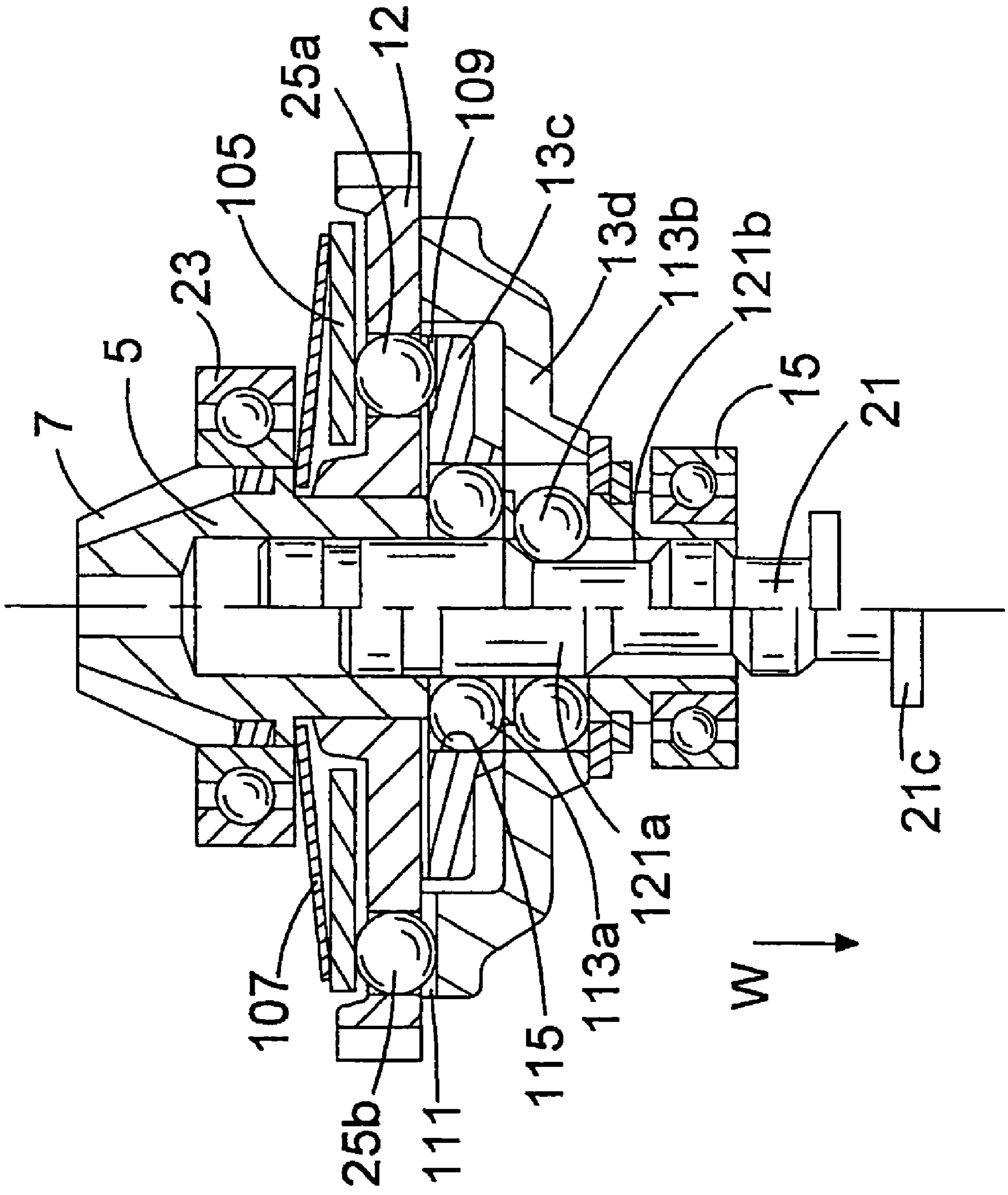
Figure 22:
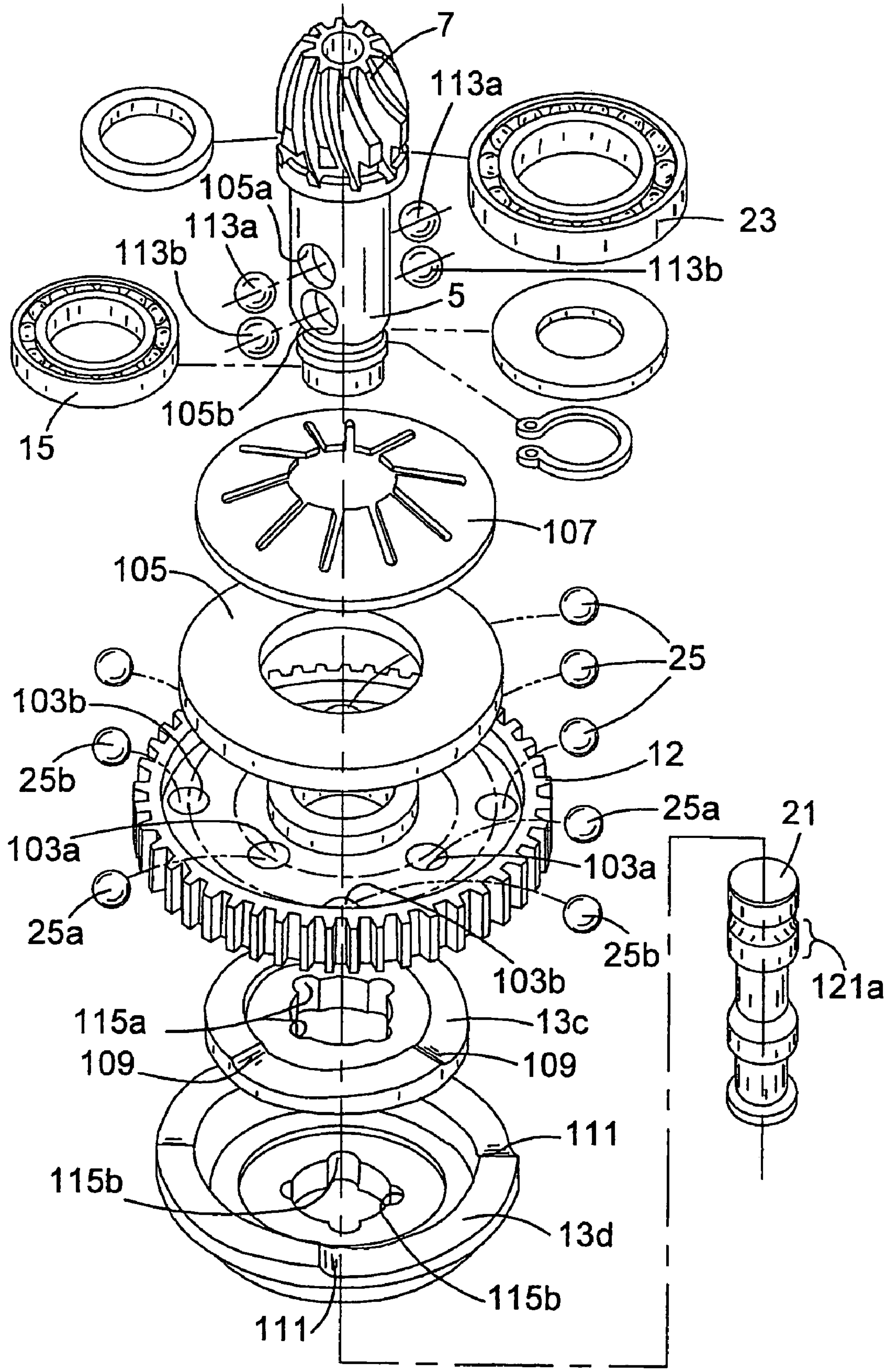
Figure 23:
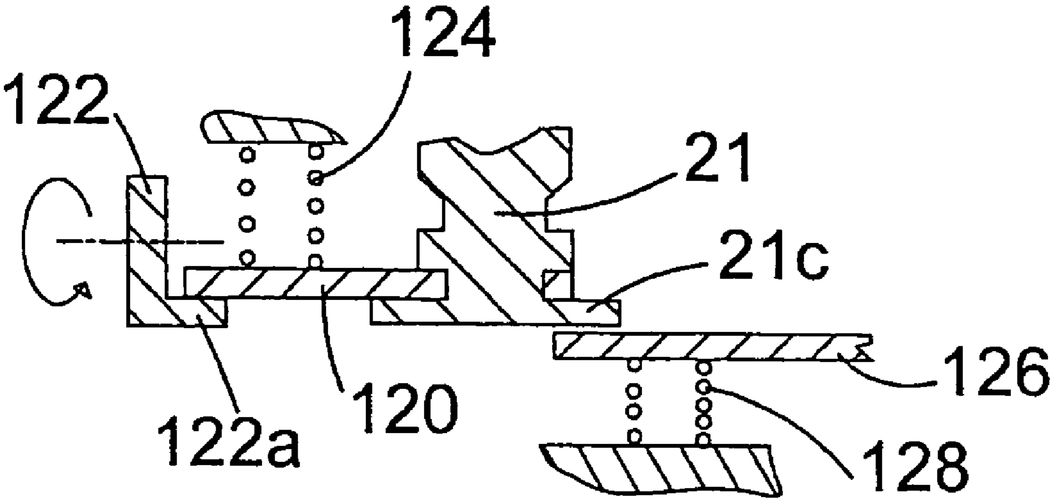
Figure 24:
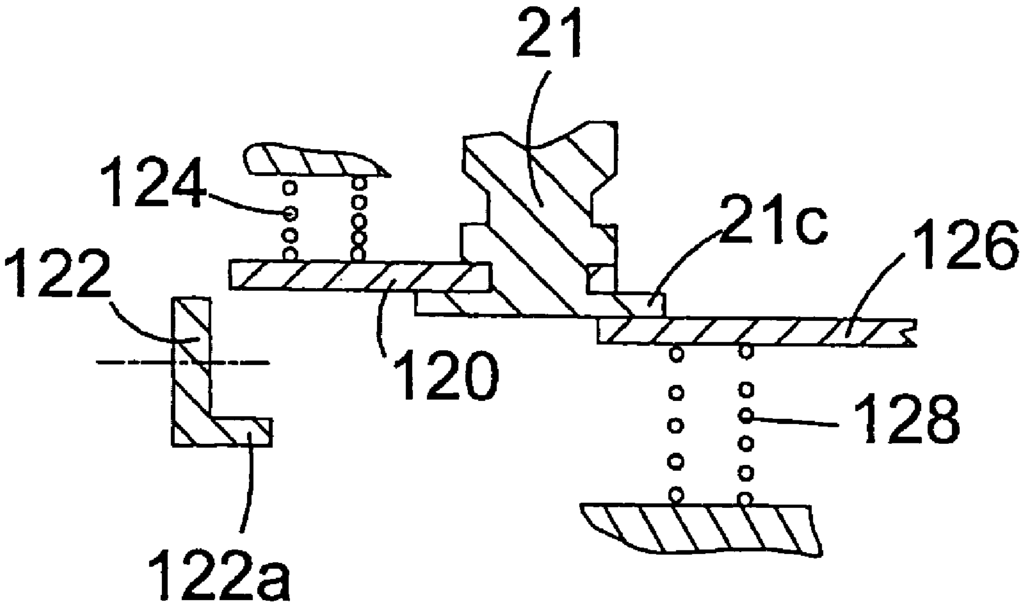
Figure 25:
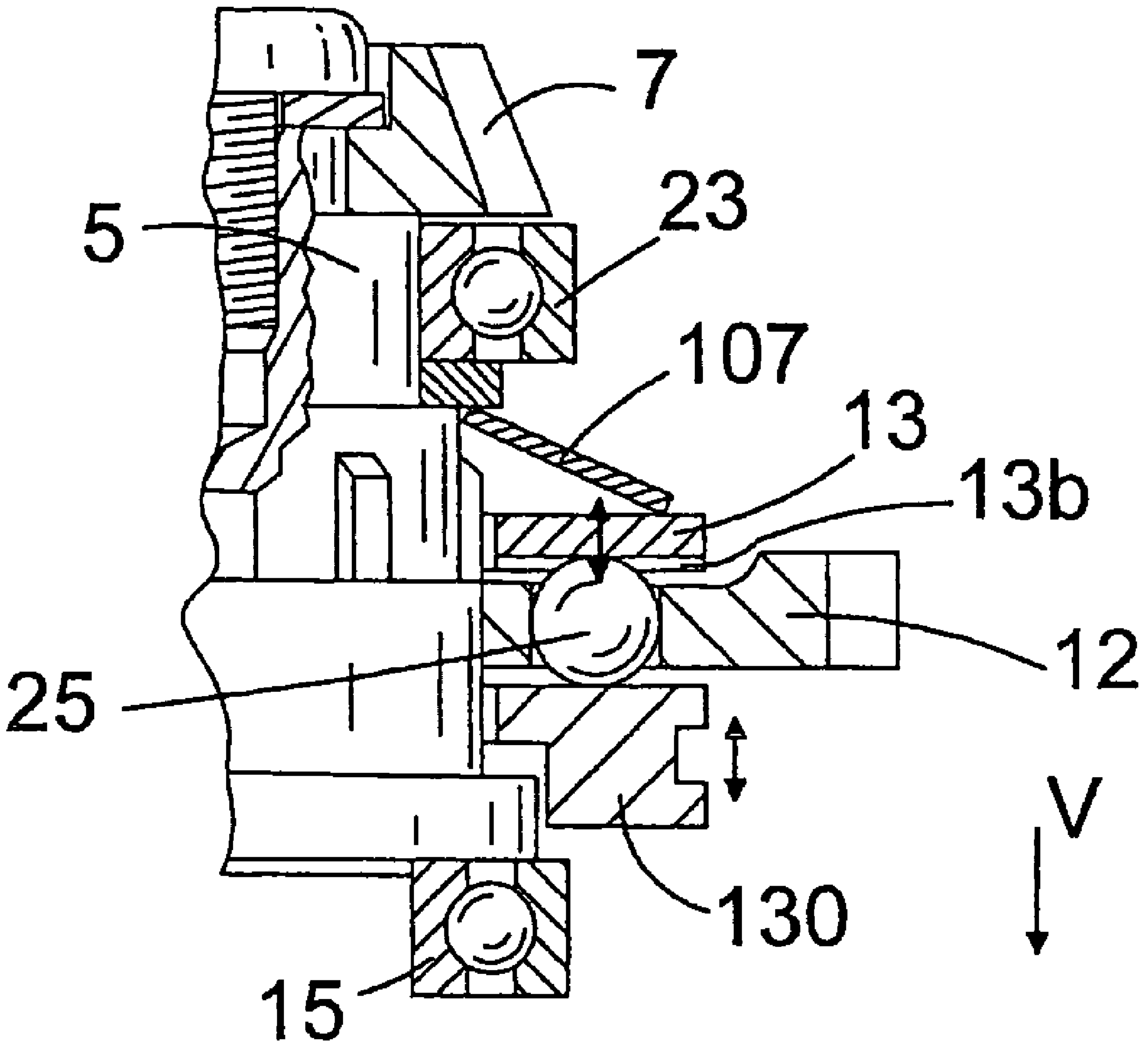

In addition, the sub-assembly housing 100 may further include a tolerance adapter 108 positioned in the hollow open of either cylindrical member. The purpose of the adapter is to limit or prevent axial motion of the inertial mass while the hammer is vibrating. It is envisioned that the adapter 108 may be a conical or curved sheet metal spring. While the above description is provided with reference to a particular housing configuration, it is readily understood that other configurations are also within the scope of the present invention. For instance, an alternative housing configuration is illustrated in FIGS. 10-12.

While the invention has been described in its presently preferred form, it will be understood that the invention is capable of modification without departing from the spirit of the invention as set forth in the appended claims.

What is claimed is:

1. A control system for a power tool having a motor drivably coupled to a rotary shaft to impart rotary motion to the shaft about a rotational axis of the tool, comprising:

an inertial mass comprised of a solid cylindrical body disposed in a housing of the power tool, the inertial mass being freely rotatable about its longitudinal axis and axially aligned with the rotational axis of the tool;

at least one sensing element in fixed relation to the housing of the power tool and configured to detect rotational motion of the housing in relation to the inertial mass; and a controller electrically connected to the at least one sensing element and operable to initiate a protective operation based on the detected rotational motion of the housing in relation to the inertial mass.

2. The control system of claim 1 wherein said controller is operable to assess the detected rotational motion of the housing in relation to a threshold which is in part based on current motor speed of the power tool.

3. The control system of claim 1 wherein said controller is further operable to determine angular velocity of the rotational motion and comparing the angular velocity to a predefined velocity threshold indicative of a bit jam condition.

4. The control system of claim 3 wherein said controller is further operable to activate a protective operation when the angular velocity of the rotational motion exceeds the predefined velocity threshold.

5. The control system of claim 3 wherein said controller is further operable to monitor direction of the rotational motion and to activate a protective operation when the angular velocity of the rotational motion exceeds the predefined velocity threshold and the direction of the rotational motion does not change within a predefined time period.

6. The control system of claim 3 wherein said controller is further operable to monitor rotational displacement and to activate a protective operation when the angular velocity of the rotational motion exceeds the predefined velocity threshold and the rotational displacement exceeds a predefined displacement threshold.

7. The control system of claim 1 wherein said controller is further operable to monitor rotational displacement and to activate a protective operation when the rotational displacement exceeds a predefined displacement threshold indicative of a bit jam condition.

8. The control system of claim 1 wherein the sensing element is further defined as an optical sensor operable to detect demarcations of the inertial mass.

9. The control system of claim 1 wherein the protective operation is selected from the group consisting of braking the rotary shaft, braking the motor, disengaging the motor from the rotary shaft, and reducing slip torque of a clutch disposed between the motor and the rotary shaft.

10. A control system for a power tool having a motor drivably coupled to a rotary shaft to impart rotary motion to the shaft about a rotational axis of the tool, comprising:

an inertial mass comprised of a solid cylindrical body disposed in a housing of the power tool, the inertial mass being freely rotatable about an axis of rotation during operation of the tool and the axis of rotation being axially aligned with the rotational axis of the tool;

at least one sensing element in fixed relation to the housing of the power tool and configured to detect rotational motion of the housing in relation to the inertial mass; and a controller electrically connected to the at least one sensing element and operable to initiate a protective operation based on the detected rotational motion of the housing in relation to the inertial mass.

11. The control system of claim 10 wherein said controller is operable to assess the detected rotational motion of the housing in relation to a threshold which is in part based on current motor speed of the power tool.

12. The control system of claim 10 wherein said controller is further operable to determine angular velocity of the rotational motion and comparing the angular velocity to a predefined velocity threshold indicative of a bit jam condition.

13. The control system of claim 12 wherein said controller is further operable to activate a protective operation when the angular velocity of the rotational motion exceeds the predefined velocity threshold.

14. The control system of claim 12 wherein said controller is further operable to monitor direction of the rotational motion and to activate a protective operation when the angular velocity of the rotational motion exceeds the predefined velocity threshold and the direction of the rotational motion does not change within a predefined time period.

15. The control system of claim 12 wherein said controller is further operable to monitor rotational displacement and to activate a protective operation when the angular velocity of the rotational motion exceeds the predefined velocity threshold and the rotational displacement exceeds a predefined displacement threshold.

16. The control system of claim 10 wherein said controller is further operable to monitor rotational displacement and to activate a protective operation when the rotational displacement exceeds a predefined displacement threshold indicative of a bit jam condition.

17. The control system of claim 10 wherein the sensing element is further defined as an optical sensor operable to detect demarcations of the inertial mass.

18. The control system of claim 10 wherein the protective operation is selected from the group consisting of braking the rotary shaft, braking the motor, disengaging the motor from the rotary shaft, and reducing slip torque of a clutch disposed between the motor and the rotary shaft.

* * * * *